May 16, 1933.  G. W. KUHLMAN  1,908,987
TRAILER ATTACHMENT
Filed Oct. 12, 1931    3 Sheets-Sheet 1

INVENTOR.
G. W. Kuhlman
BY
Morsell & Morsell
ATTORNEY.

May 16, 1933. G. W. KUHLMAN 1,908,987
TRAILER ATTACHMENT
Filed Oct. 12, 1931 3 Sheets-Sheet 2
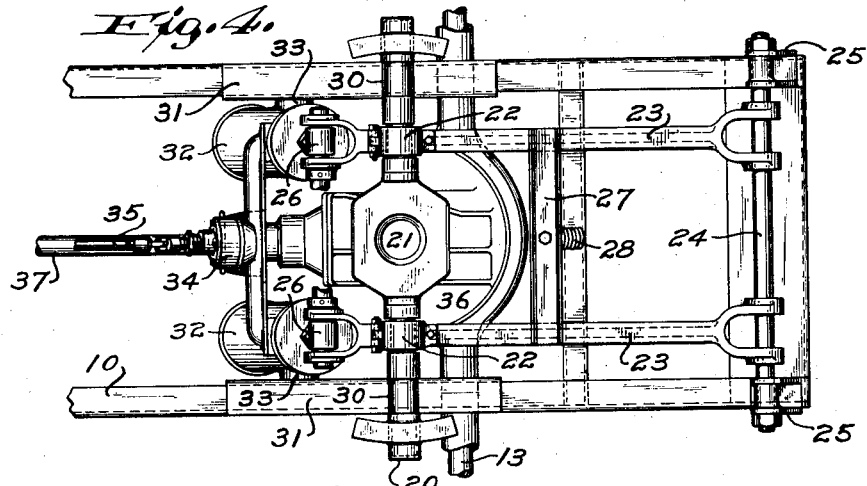
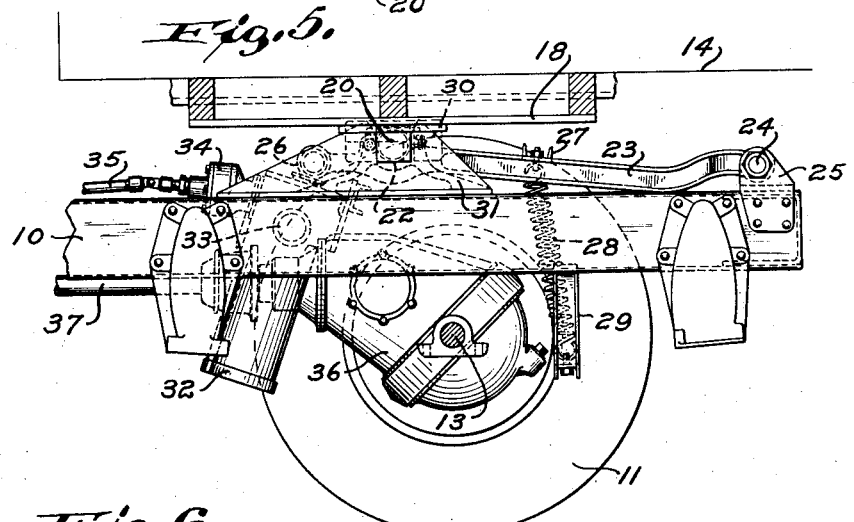
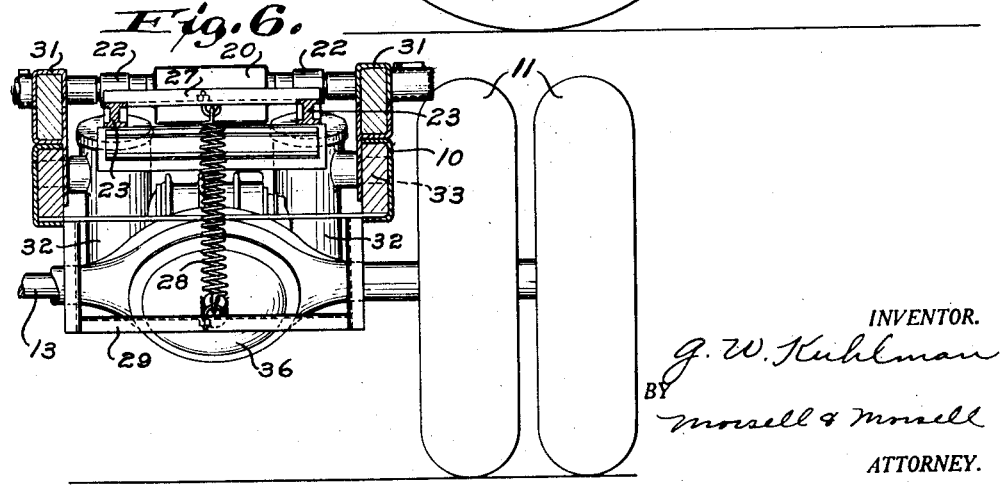
INVENTOR.
G. W. Kuhlman
BY
Morsell & Morsell
ATTORNEY.

May 16, 1933.  G. W. KUHLMAN  1,908,987
TRAILER ATTACHMENT
Filed Oct. 12, 1931    3 Sheets-Sheet 3

INVENTOR.
G. W. Kuhlman
BY
Morsell & Morsell
ATTORNEY.

Patented May 16, 1933

1,908,987

UNITED STATES PATENT OFFICE

GEORGE W. KUHLMAN, OF NEW YORK, N. Y., ASSIGNOR TO THE HEIL CO., OF MILWAUKEE, WISCONSIN, A CORPORATION OF WISCONSIN

TRAILER ATTACHMENT

Application filed October 12, 1931. Serial No. 568,242.

The present invention relates in general to improvements in the art of transportation, and relates more specifically to an improved mechanism for facilitating attachment and detachment of trailers to and from vehicles such as tractors.

Generally stated, an object of the invention is to provide an improved vehicle coupling which is simple in construction and efficient in operation.

It has heretofore been proposed, as shown in copending application Serial Number 330,799, filed January 7th, 1929, to utilize a duplex hydraulic hoist cooperable directly with a lower fifth wheel member carried by the rear portion of a tractor, to facilitate movement of the said member into and out of operative engagement with a complementary upper fifth wheel member and king pin carried by the forward end of a trailer. In this prior structure the lower fifth wheel member associated with the tractor was not universally connected to the hoisting mechanism, but the duplex hoist cooperated with the lower fifth wheel member to permit slight lateral displacement of the forward end of a trailer being drawn by the tractor. In coupling mechanisms of this type, it is desirable to have the actual draft connection located as near to the rear tractor driving wheels, as possible. While the elimination of the universal connection between the lower fifth wheel member and the hoisting mechanism in this prior device was highly satisfactory, it was found difficult in certain types of tractors to locate the draft connection as close as desirable to the rear wheels and axle of the tractor without introducing interference between the hoist and the rear tractor axle as well as other chassis elements.

It is a more specific object of the present invention to provide an improved trailer attachment possessing all of the advantages of this prior structure, and additionally permitting location of the hoist so as to avoid interference with chassis structure.

Another specific object of the invention is to provide an improved coupling and uncoupling device for vehicles wherein the draft connection between the vehicles may be located at the most effective position upon the tractor, while the hoisting mechanism may be disposed remote from the actual draft connection.

A further specific object of the invention is to provide a mechanism for facilitating attachment and detachment of trailers to and from tractors, wherein the actuating mechanism may be most conveniently located and in which the use of complicated connections such as universal joints is avoided between the actuating mechanism and the coupling members.

These and other objects and advantages will be apparent from the following detailed description.

A clear conception of several embodiments of the invention and of the mode of constructing and of manipulating coupling mechanisms built in accordance therewith, may be had by referring to the drawings accompanying and forming a part of this specification, in which like reference characters designate the same or similar parts in the various views:

Fig. 4 is an enlarged top view of the rear end of the chassis of a tractor equipped with one of the improved attachments;

Fig. 5 is a part sectional side view of the rear end of the tractor and of the forward end of a semi-trailer;

Fig. 6 is a transverse section through the chassis frame of the tractor and through a portion of the trailer draft mechanism;

While the improved mechanism will be described herein by way of illustration, as being applied for the purpose of attaching or detaching semi-trailers to and from motor driven tractors or trucks, it will be apparent that the improvement is capable of more general use in connection with vehicles of various types. The scope of the invention should not therefore be restricted by the specific disclosure.

Figure 1:
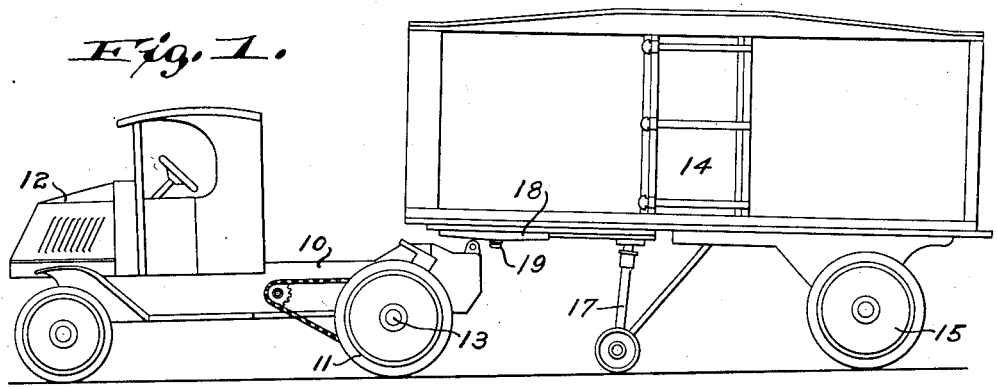
Fig. 1 is a diagrammatic side elevation of a tractor and semi-trailer, showing the latter detached from the former and disposed rearwardly thereof preparatory to coupling.
Figure 2:
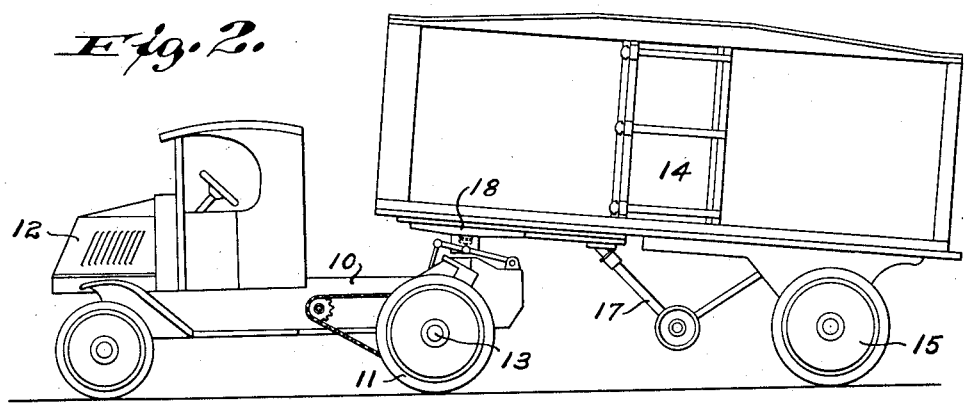
Fig. 2 is a similar side elevation of the tractor and semi-trailer, showing the rear end of the tractor moved into position beneath the forward end of the semi-trailer, preparatory to coupling.
Figure 3:
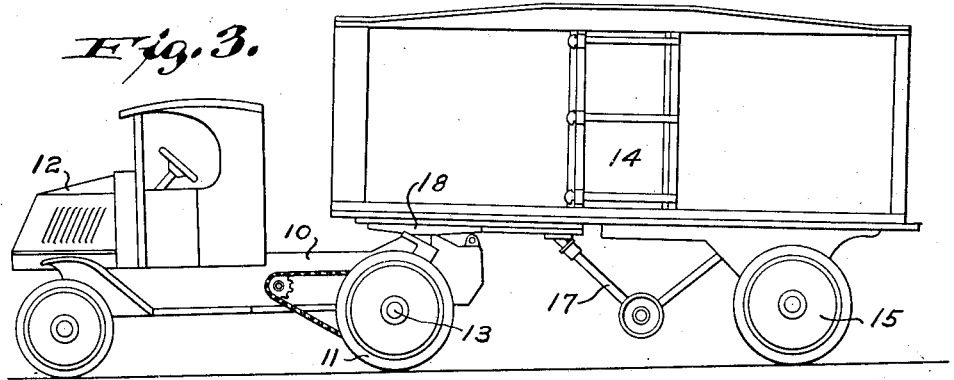
Fig. 3 is a similar side elevation of the tractor and semi-trailer, showing the same completely coupled in a manner to permit pulling of the trailer by operation of the tractor.

Referring specifically to the diagrams of Figs. 1 to 3 inclusive, the tractor or truck comprises a chassis frame 10 supported upon wheels 11 driven by a motor located beneath the hood 12, in a well known manner. The mechanism for facilitating attachment and disconnection of a vehicle which is to be drawn, to and from the tractor, is preferably associated with the chassis frame 10 closely adjacent to the rear driving axle 13. The semi-trailer shown in Figs. 1 to 3 inclusive, comprises a body 14 mounted upon rear wheel 15 and having an auxiliary support 17 adjustably associated with the medial portion thereof. The forward portion of the semi-trailer carries an upper fifth wheel member 18 and king pin 19, these elements being cooperable with a lower fifth wheel member vertically adjustably supported upon the rear end of the tractor and constituting part of the improved mechanism. This latter structure will be subsequently described more in detail, but when the trailer is entirely disconnected from the tractor or truck, as shown in Fig. 1, the auxiliary support 17 is positioned as indicated and cooperates with the rear trailer wheels 15 to support the body 14 independently of the truck. In Fig. 2 the forward end of the trailer body 14 has been elevated preparatory to final coupling of the truck and trailer, the auxiliary support 17 being withdrawn from the ground and the weight of the forward end of the trailer being supported upon the hoists. In Fig. 3 the hoists have been operated to lower the forward trailer end into draft engagement with the chassis frame 10 of the truck, the auxiliary support 17 also remaining inactive during such union of the semi-trailer and propelling truck.

In the embodiment of coupling mechanism shown in Figs. 4 to 6 inclusive, the upper fifth wheel member 18 and king pin 19 of the semi-trailer, are adapted to coact with a bolster bar 20 constituting a lower fifth wheel member, said bar having a central opening 21 cooperable with the king pin 19 and also having central and end upper surfaces cooperable directly with the lower bearing surfaces of the upper fifth wheel member 18. The fifth wheel which consists of the member 18, king pin 19 and bar 20, permits relative swinging of the tractor and trailer about the axis of the king pin 19 in a well known manner. The portions of the cross-bar 20 directly adjoining its central enlargement, are snugly journaled in bearings 22 carried by medial portions of levers 23 the rear ends of which are swingable upon a pivot 24 carried by brackets 25 secured to the rear end of the chassis frame 10 and the front ends of which are pivotally connected to the upper extremities of the piston rods 26. The two parallel levers 23 are rigidly united by a cross-bar 27 and the H-frame thus produced is constantly urged to swing downwardly about the pivot 24 and against the lifting action of the hoists, by means of a tension spring 28 having its upper end secured to the cross brace 27 and its lower end secured to a cross-bracket 29 attached to the chassis frame 10. The portions of the cross-bar 20 between the bearings 22 and the outer fifth wheel bearing surfaces of the bar, are formed to enter sockets 30 in side brackets 31, when the levers 23 have been completely lowered, thus providing a direct draft connection between the chassis frame 10 and the fifth wheel during normal haulage of the trailer by the truck.

The hydraulic hoisting mechanism comprises duplex hoisting cylinders 32 having pistons movable therein to elevate and lower the piston rods 26, the piston displacement chambers being interconnected so as to establish equal pressures in the two cylinders. The cylinders 32 have trunnions 33 coacting with the chassis frame 10, and receive their liquid supply from a pump 34 driven by the truck motor through a drive shaft 35. The use of the levers 23 cooperating with the piston rods 26, makes it possible to position the hoist cylinders 32 so as not to interfere with the rear axle 13 and with the differential casing 36 associated with this axle, and a tractor drive shaft 37 may be disposed between the laterally spaced cylinders 32, if the tractor is not of the chain driven type shown in Figs. 1 to 3 inclusive.

During normal operation of the coupling mechanism shown in Figs. 4 to 6 inclusive, and assuming the parts to be assembled as shown in Fig. 5, the end portion of the bolster bar 20 are in engagement with the sockets 30 of the side brackets 31 and the tractive pull is being transmitted from the chassis frame 10 directly through the brackets 31 and bolster bar 20 to the king pin 18 disposed within the opening 21. The bolster bar 20 is free to rock upon its horizontal axis in the bearings 22 of the levers 23, and the king pin 18 is free to turn about its own axis within the opening 21. Due to the fact that the bolster bar 20 is snugly journaled in the bearings 22, this bar cannot tilt laterally of the tractor, and such lateral tilting is also prevented by the rigid construction of the H-frame comprising the levers 23 and the cross brace 27. If it becomes desirable to disconnect the semi-trailer from the truck, the hoisting mechanism may be operated to cause the piston rods 26 to elevate the front ends of the levers 23, to the position shown in Fig. 2. The auxiliary support 17 for the semi-trailer may then be brought into action and disposed as shown in Fig. 1. After the auxiliary support 17 has been thus properly positioned, the piston rods 26 may again be lowered to withdraw the lower fifth wheel member or bolster bar 20 from the king pin 18. As the forward portion of the body 14 of the semi-trailer moves downwardly during initial lowering operation, the auxiliary support 17 becomes effective and cooperates with the wheels 15 to support the body 14 with the king pin 19 above the opening 21 when the latter is in lowermost position. Continued lowering movement of the bolster bar 20 will cause the king pin 18 to be withdrawn from the opening 21, whereupon the tractor may be removed and the semi-trailer will be left in self-supported condition. In order to couple the tractor or truck and the semi-trailer, it is only necessary to reverse the uncoupling operation, and it will therefore be apparent that the vehicles may be readily united or disconnected with the aid of the hoisting mechanism. The spring 28 acting upon the rigid H-frame assists the downward movement of the piston rods 26 and thereby speeds up the coupling and disconnecting operations, and the brackets 31 serve to effectively relieve the hoisting and lowering mechanisms from normal traction stresses.

Figure 7:
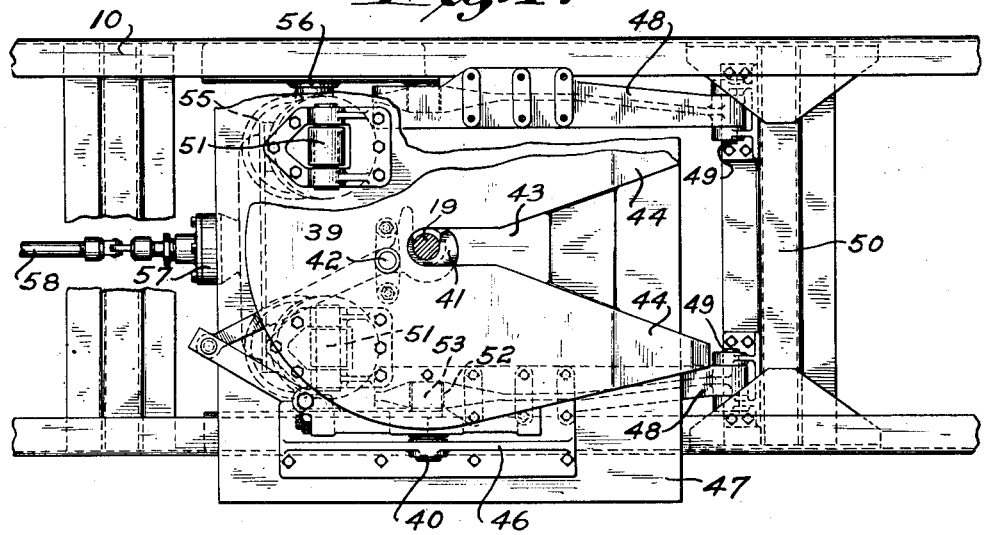
Fig. 7 is a fragmentary top view of the rear end of the tractor chassis frame showing another form of the improved trailer attachment associated therewith.
Figure 8:
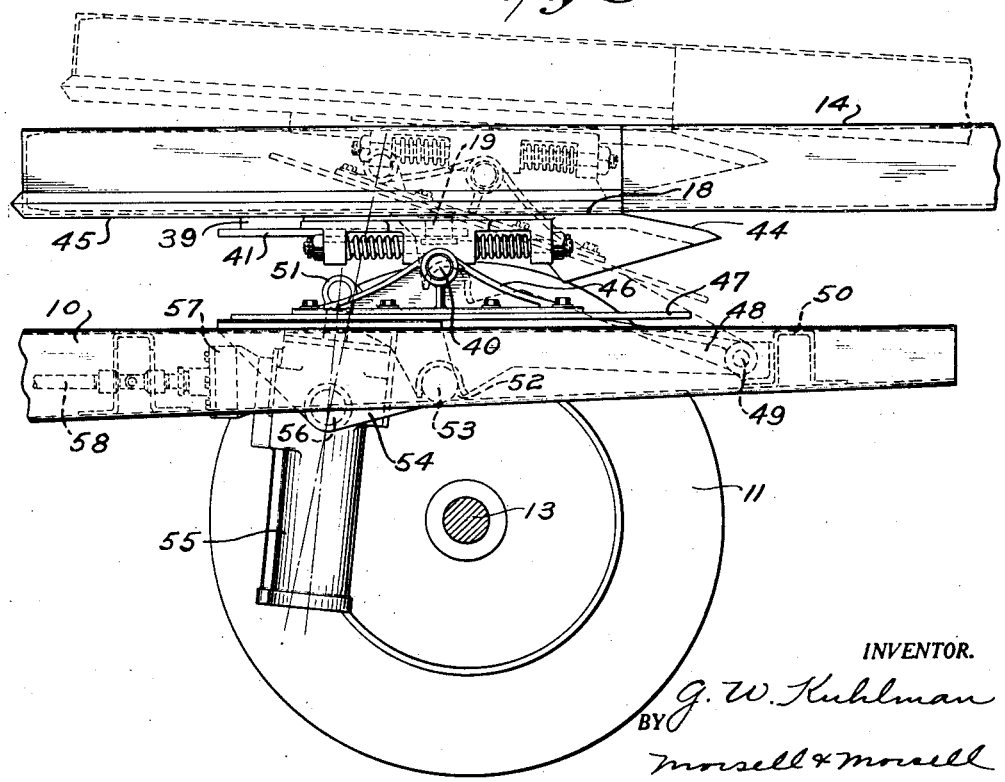
Fig. 8 is a part sectional side elevation of the chassis frame and mechanism shown in Fig. 7, also illustrating the application of the forward end of a trailer to the mechanism.

In the embodiment of coupling mechanism shown in Figs. 7 and 8, the upper fifth wheel member 18 is adapted to coact with a bifurcated plate 39 having integral side pivots 40, and the king pin 19 is engageable with a hook 41 swingably supported upon a pivot 42 secured to the plate 39. The plate 39 and hook 41 constitute the lower fifth wheel member, and the king pin 19 may be slid into position centrally of the plate 39 through a slot 43 the opposite sides of which diverge rearwardly so as to properly guide the king pin in place during the coupling operation. The rear end portions 44 of the plate bifurcations are also inclined as shown, and the forward end of the trailer may be provided with skids 45 cooperable with the inclined portions 44 to lift the forward part of the trailer during the coupling operation whereby the front trailer support is elevated from the ground. The hook 41 may be swung about its pivot 42 in any suitable manner and when positioned as shown in Fig. 7, locks the king pin in the forward end of the slot 43 centrally of the plate 39. The side pivots 40 of the plate 39 are journaled in brackets 46 which are rigidly attached to a lower plate 47 which is mounted upon and rigidly interconnects a pair of levers 48. The rear ends of the levers 48 are swingably supported upon pivots 49 supported upon a cross-beam 50 of the chassis frame 10, and the front ends thereof are pivotally connected with the upper ends of the piston rods 51. The medial lower portions of the levers 48 are provided with alined sockets 52 formed to receive draft pins 53 secured to a bracket 54 rigidly attached to the chassis frame 10, when the levers are swung into their lowermost position, and to thus provide a direct draft connection between the chassis frame 10 and the levers 48.

The hydraulic hoisting mechanism is similar to that previously described, and comprises duplex hoisting cylinders 55 having pistons movable therein to raise and lower the piston rods 51 which are attached to the rear ends of the levers 48. The displacement chambers of the cylinders 55 are interconnected to establish equal pressures in the two cylinders, and the cylinders are rigidly connected and are provided with trunnions 56 which are pivotally associated with the brackets 54. Liquid under pressure is delivered to the cylinders 55 by a pump 57 driven from the truck motor through a shaft 58 to elevate the piston rods 51, and the weight of the structure resting upon these piston rods serves to lower the pistons when the displacement chambers are connected to the exhaust.

During normal operation of the coupling mechanism shown in Figs. 7 and 8, and assuming the parts to be assembled as illustrated in full lines in Fig. 8, the draft pins 53 of the chassis frame 10 are in engagement with the sockets 52 of the levers 48 and are thus adapted to relieve the hoisting mechanism from tractive stresses. The lower fifth wheel member comprising the plate 39, is free to rock upon the horizontal transverse pivots 40, and the king pin 19 of the upper fifth wheel member 18 is free to turn about its own axis within the end of the slot 43 and in the locking hook 41. Due to the fact that the side pivots 40 of the plate 39 are snugly journaled in the brackets 46 which are in turn rigidly attached to the lower plate 47, the lower fifth wheel member cannot tilt laterally with respect to the tractor, and such lateral tilting is also positively prevented by the rigid connection between the levers 48 afforded by the lower plate 47. If it becomes desirable to disconnect the trailer from the truck, the hoisting mechanism will be operated to cause the piston rods 51 to elevate the front ends of the levers 48, to the piston shown in dotted lines in Fig. 8. The hook 41 may then be released whereupon forward movement of the tractor will cause the king pin 19 to slide out of the slot 43, the skids 45 riding over the inclined portions 44 of the plate 39. The draft connection will thus be automatically broken as the tractor is moved forwardly with respect to the trailer. The hoisting mechanism may then be operated to lower the rods 51 and the elements supported thereby into normal position as shown in full lines in Fig. 8. In order to subsequently attach a trailer to the tractor, it is only necessary to back the rear end of the tractor toward the forward end of the trailer, whereupon the inclined portions 44 of the plate 39 will engage the trailer skids 40, and the rearwardly diverging side portions of the slot 43 will become effective to guide the king pin 9 of the upper fifth wheel member into proper position for engagement by the hook 41.

From the foregoing description it will be apparent that the invention provides simple and highly effective means for readily connecting a trailer to a tractor, and for just as readily disconnecting the elements. The levers interposed between the hoisting mechanism and the lower fifth wheel member, permit disposition of the hoisting mechanism so as not to interfere with the rear axle of the truck, while still permitting disposition of the draft connection as near to the rear driving axle as possible. The structure entirely avoids the use of universal connections between the lower fifth wheel member and the hoisting mechanism, since the H-frame which is disposed between the hoisting mechanism and the lower fifth wheel member is of rigid construction and the only relative motion between the hoists and the lower fifth wheel member carried by the tractor, is swinging motion in the plane of travel of the tractor. The improved coupling mechanism has proven highly successful in commercial operation and may be used either with trailers, or with so-called semi-trailers. By providing a direct draft connection between the lower fifth wheel member and the tractor chassis, the hoisting mechanism is relieved from undesirable stresses during normal transportation of the vehicles, and the hoisting mechanism may be of any type other than the hydraulic duplex hoist disclosed herein.

The improved coupling mechanism is moreover especially advantageous when used in conjunction with semi-trailers having auxiliary supports 17 adapted to support the trailers when disconnected from the tractor. The hydraulic hoist permits elevation and lowering of the fifth wheel member which is carried by the truck, so that this fifth wheel member will properly coact with the complementary fifth wheel member of the trailer at all times, and without providing for adjustment in height at the auxiliary support 17. When the automatic coupling type of fifth wheel member or plate 39 is utilized, the inclined elevating portions 44 may be readily positioned by operating the hoist on the truck, so that they will effectively cooperate with the fifth wheel member 18 and skids 45 of the trailer irrespective of whether the support 17 is resting on high or low ground, as the tractor is backed into coupling engagement with the trailer.

It should be understood that it is not desired to limit the invention to the exact details of construction herein shown and described, for various modifications within the scope of the claims may occur to persons skilled in the art.

It is claimed and desired to secure by Letters Patent:

1. A truck trailer connection comprising, a vehicle having a rear axle and hoisting mechanism mounted on said vehicle forwardly of said axle, a lever pivotally associated with said vehicle rearwardly of said axle and swingable by said mechanism in the longitudinal plane of said vehicle, a lower fifth wheel member pivotally supported by said lever between the lever pivot and said mechanism, said lower member being swingable about its supporting pivot only in the plane of swing of said lever, means providing a direct draft connection between the pivot of said lower fifth wheel member and the vehicle, and a trailer having an upper fifth wheel member pivotally associable with said lower member.

2. A truck trailer connection comprising, a vehicle having a rear drive and hoisting mechanism mounted upon the vehicle on one side of said drive, a lever swingable by said mechanism about a pivot disposed on the opposite side of said drive, means providing a direct draft connection between a medial portion of said lever and said vehicle, a fifth wheel member carried by the medial portion of said lever, said member being swingable only in the plane of travel of said vehicle, and a trailer having another fifth wheel member pivotally associable with said first mentioned member.

3. A truck trailer connection comprising, a vehicle having a driving axle and hoisting mechanism mounted upon the vehicle forwardly of said axle, a lever swingable by said mechanism about a pivot disposed rearwardly of said axle, means providing a direct draft connection between a medial portion of said lever and said vehicle, a fifth wheel member carried by said lever and swingable thereon only in the plane of travel of said vehicle, and a trailer having a complementary fifth wheel member associable with said first mentioned member.

4. A truck trailer connection comprising, a vehicle having thereon a hoist including a pair of parallel simultaneously movable rods, a pair of parallel inter-connected levers swingable about a common pivot located at the rear ends of the levers and of the vehicle, each of said levers having its forward swinging end pivotally connected to one of said rods independently of the other, a fifth wheel member pivotally supported by both of said levers between their rear and forward ends, said fifth wheel member being tiltable relative to said levers only about an axis which is parallel to the axis of said common lever pivot, and a complementary fifth wheel member pivotally associated with said first mentioned member.

5. A truck trailer connection comprising, a vehicle having thereon a hoist including a pair of parallel simultaneously movable rods, a pair of parallel inter-connected levers swingable about a common pivot located at the rear ends of the levers and of the vehicle, each of said levers having its forward swinging end pivotally connected to one of said rods independently of the other, a fifth wheel member pivotally supported by both of said levers between their rear and forward ends, said fifth wheel member being tiltable relative to said levers only about an axis which is parallel to the axis of said common lever pivot, means providing a direct draft connection between the pivot of said lower fifth wheel member and the vehicle, and a complementary fifth wheel member pivotally associable with said first mentioned member.

In testimony whereof, I affix my signature.

GEORGE W. KUHLMAN.